Aug. 25, 1925.  
G. I. FRANCIS  
1,551,094  
FRAME FOR CYCLES, MOTOR CYCLES, AND THE LIKE  
Filed Dec. 8, 1923    2 Sheets-Sheet 1
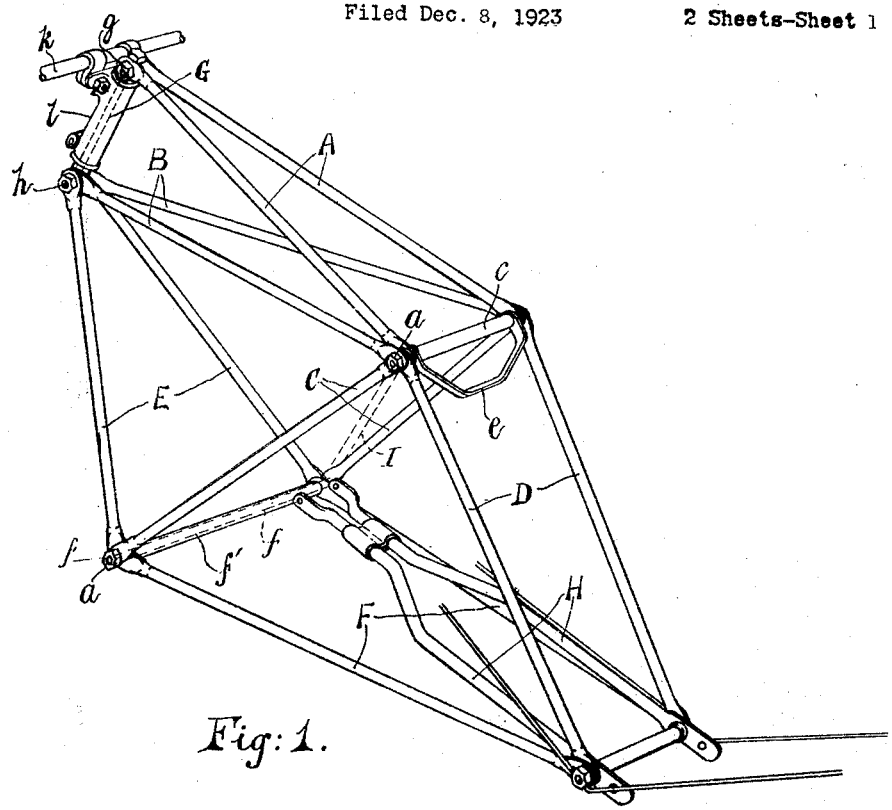
Fig: 1.
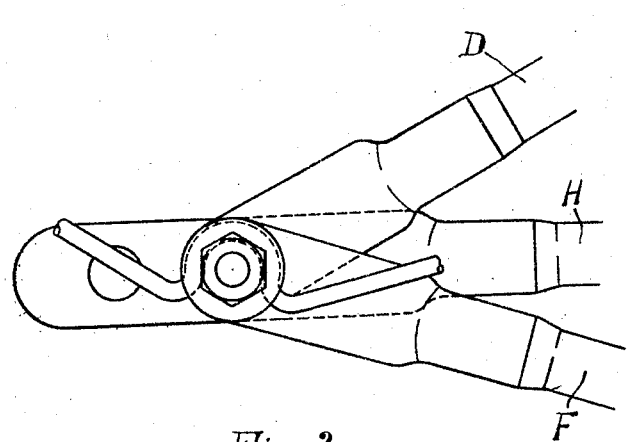
Fig: 2.
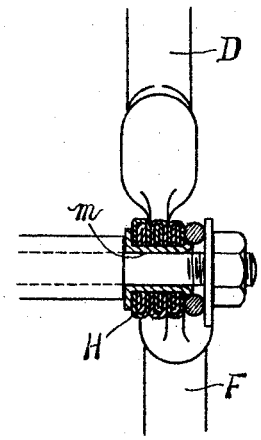
Fig: 3.
Inventor  
Gordon Inglesby Francis  
Per J. Fletcher Wilson  
Attorney.

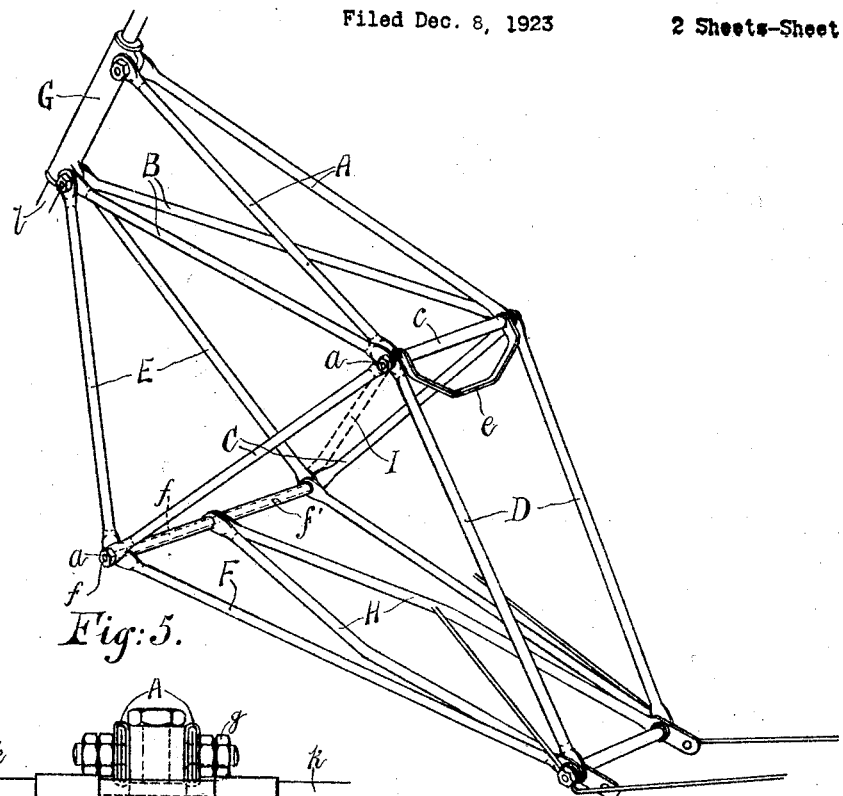
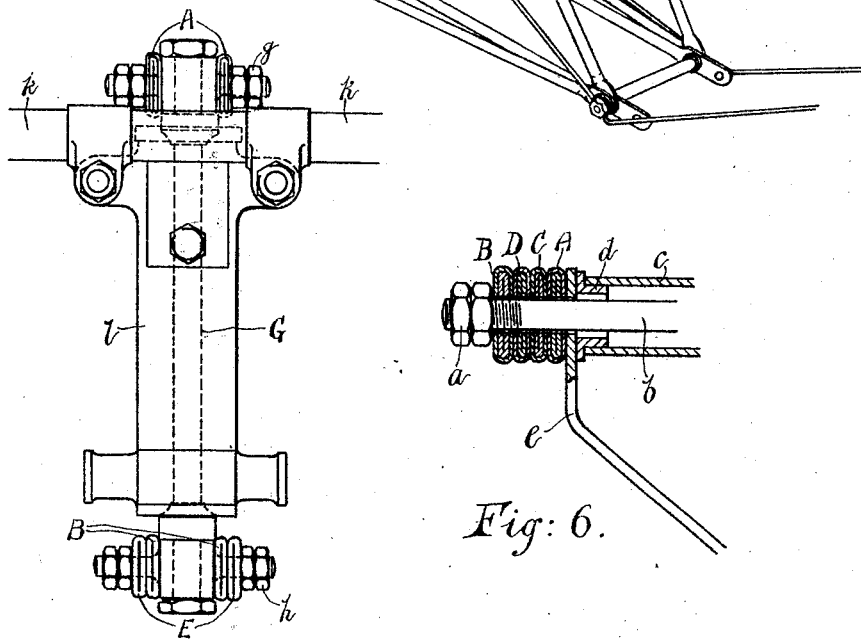

Patented Aug. 25, 1925.

1,551,094

UNITED STATES PATENT OFFICE.

GORDON INGLESBY FRANCIS, OF TILE HILL, NEAR COVENTRY, ENGLAND.

FRAME FOR CYCLES, MOTOR CYCLES, AND THE LIKE.

Application filed December 8, 1923. Serial No. 679,464.

*To all whom it may concern:*

Be it known that I, GORDON INGLESBY FRANCIS, a subject of the King of Great Britain, residing at New Road, Tile Hill, near Coventry, in the county of Warwick, England, have invented a new or Improved Frame for Cycles, Motor Cycles, and the like, of which the following is a specification.

The object of the present invention is to provide a new or improved system of frame construction for cycles, motorcycles and the like which whilst being light and strong may be produced at a much lower cost than the conventional brazed frame. The improved construction also affords a number of incidental advantages which will become apparent from the following description.

A cycle or motorcycle frame constructed in accordance with the present invention is characterized by two principal features viz: the entire absence of brazed joints and the universal use of straight tubes with the exception in certain cases only of the saddle stays which in the case of a belt drive may require to be slightly cranked to clear the belt drum on the driving wheel.

Each member of the main frame is also duplicated, the two straight tubes comprising each member being spaced apart in the form of a triangle.

In the accompanying drawings,

Figure 1 shews a mortorcycle frame constructed according to this invention.

Figures 2 and 3 are enlarged side and cross-sectional detail views respectively of the rear fork end connections.

Figure 4 is an enlarged front detail view of the steering head and adjacent parts.

Figure 5 is a view similar to Figure 1 illustrating a slight modification.

Figure 6 is an enlarged detail view of the connections at the saddle pillar tube.

Throughout the drawing like parts are designated by similar reference characters.

As will be clearly seen from the drawings the rear ends of the tubes forming the top and intermediate rails A, B respectively and the upper ends of the two pairs of straight tubes forming the diagonal member and saddle stays C, D respectively are all secured by nuts $a$ to the ends of a horizontal bolt $b$ which passes through a tubular distance piece $c$ and carries the saddle. This connection is shewn in detail in Figure 6 where it will be seen that the suitably trapped and perforated ends of the various tubes of the several frame members are clamped between the nuts $a$ and the distance piece $c$, the open ends of the latter being fitted with plugs $d$. The ends of a bracket $e$ which supports the rear mudguard may also be conveniently threaded onto the same bolt preferably in advance of the atachment of the ends of the tubes.

In the case of the top and intermediate rails A, B the tubes comprising each rail together with the bolt $b$ form a compound triangulated construction which whilst being light and strong also at the same time provides a seating for the petrol tank.

The lower ends of the two straight tubes constituting the front down member E of the main frame together with those of the diagonal member C and the forward ends of the two pairs of straight tubes constituting the bottom stays F are all secured by nuts $a$ to a horizontal transverse spindle $f$ the intermediate portion of which carries a tubular support $f'$ for the engine. The tubes comprising each of these frame members being wider apart at their attachment to the ends of the spindle $f$ than at their other ends gives a triangular or approximately triangular construction for each member, the spindle $f$ being the common base.

The forward ends of the two straight tubes constituting the top rail A are bolted at $g$ to lugs on the upper end of the steering head G and the forward ends of the two pairs of straight tubes constituting the intermediate member B and the down member E are similarly bolted at $h$ to lugs on the lower end of the said steering head.

The steering head itself may be of the conventional type shewn in Figure 5 with the steering pillar $l$ rotatably mounted in a relatively fixed tubular steering head G which in this case would be provided at the top and bottom with projections at each side to receive the ends of the tubes constituting the frame members A, B and E.

Where a reversed construction of steering head is adopted, as shewn in Figure 1 and more clearly in Figure 4, the front forks (not shewn) and handlebars $k$ may be carried by or from a tubular steering pillar $l$ rotatably mounted exteriorly about the steering head G to the upper and lower ends of which the front ends of the tubes constituting the frame members A, B and E respectively are bolted.

The combination of the improved frame herein described and a reversed arrangement of steering head such as that shewn in Figure 1 and in detail in Figure 4 provides a particularly economical construction.

In the case more particularly of a motorcycle frame embodying this invention a pair of additional stays H may run either from the engine, as in Figure 1, or from the centre of the transverse spindle $f$, as in Figure 5, to the rear fork-ends.

These additional stays which may be slightly cranked to clear the belt drum on the rear wheel provide a further support for the engine at the rear and at the same time may carry or be fashioned to serve as an anchorage or platform for a gear box.

The connection of the several tubes comprising the back and bottom stays and the additional stays aforesaid is shewn in the enlarged detail views Figures 2 and 3. The end of the wheel spindle is provided with flanged bushes $m$ the outer ends of which are preferably expanded after the trapped and perforated ends of the tubes have been placed in position thereon, the object being to hold these ends together when the wheel is removed from the machine.

If found necessary or desirable the main frame may be trussed by a member I shewn in dotted lines in Figure 5, which runs from one end of the horizontal bolt $b$ carrying the saddle to the opposite end of the transverse spindle $f$.

The tubes employed in building up the frame may be of any desired cross-section and where the ends of a number of them are threaded onto a bolt or spindle the order in which their ends are arranged is preferably such as involves the least amount of trapping or swaging so that the full strength of the tube may be preserved as far as possible.

I claim:—

1. A frame for cycles, motorcycles and the like comprising a steering head; top and intermediate rails each comprising a pair of tubes having trapped and perforated ends adapted for detachable connection at one end with the upper and lower parts respectively of the steering head and similarly connected at their other ends to the ends of a transverse bolt common to both rails; a front down member and a diagonal member each comprising a pair of tubes having trapped and perforated ends adapted for detachable connection with the ends of a transverse spindle common to both members and respectively secured in like manner at their other ends to the lower end of the steering head and to said transverse bolt; back and bottom stays having trapped and perforated ends and respectively secured at one end to the transverse bolt and to the transverse spindle and adapted for independent detachable connection at their other ends with the rear wheel spindle.

2. A frame for cycles, motorcycles and the like comprising a steering head; top and intermediate rails each comprising a divergent pair of straight tubes having trapped and perforated ends adapted to be bolted together and to the upper and lower parts respectively of the steering head at one end and similarly secured at their divergent ends by a transverse bolt common to both rails; a front down member and a diagonal member each comprising a divergent pair of straight tubes having trapped and perforated ends adapted to be bolted at their divergent ends to the ends of a transverse spindle common to both members and similarly connected at their other ends to the lower part of the steering head and to the transverse bolt respectively; back and bottom stays having trapped and perforated ends and respectively secured at one end to the transverse bolt and to the transverse spindle and adapted for independent detachable connection at their other ends with the rear wheel spindle.

3. A frame for cycles, motorcycles and the like comprising a steering head; top and intermediate rails each comprising a pair of tubes having trapped and perforated ends adapted for detachable connection at one end with the upper and lower parts respectively of the steering head and similarly connected at their other ends to the ends of a transverse bolt common to both rails; a front down member and a diagonal member each comprising a pair of tubes having trapped and perforated ends adapted for detachable connection with the ends of a transverse spindle common to both members and respectively secured in like manner at their other ends to the lower end of the steering head and to said transverse bolt; back and bottom stays having trapped and perforated ends and respectively secured at one end to the transverse bolt and to the transverse spindle and adapted for independent detachable connection at their other ends with the rear wheel spindle, and a pair of additional stays having trapped and perforated ends adapted for detachable connection at one end with the said rear wheel spindle and having their other ends left free and adapted for attachment to the engine.

4. A frame for cycles, motorcycles and the like comprising a steering head; top and intermediate rails each comprising a divergent pair of straight tubes bolted together and to the upper and lower parts respectively of the steering head at one end and secured together at their divergent ends by a transverse bolt common to both rails; a front down member and a diagonal member each comprising a divergent pair of straight tubes bolted at their divergent ends to the ends of a transverse spindle common to both members and at their other ends to the lower part of the steering head and to the transverse bolt respectively; a pair of straight back stays and a pair of straight bottom stays both adapted for detachable and independent connection at one end with the rear wheel spindle, the members of each pair being connected together at their other ends by the transverse bolt and transverse spindle respectively; and a truss member running from one end of the transverse spindle to the opposite end of the transverse bolt.

5. A frame for cycles, motorcycles and the like comprising a steering head; top and intermediate rails each comprising a divergent pair of straight tubes bolted together and to the upper and lower parts respectively of the steering head at one end and secured together at their divergent ends by a transverse bolt common to both rails; a front down member and a diagonal member each comprising a divergent pair of straight tubes bolted at their divergent ends to the ends of a transverse spindle common to both members and at their other ends to the lower part of the steering head and to the transverse bolt respectively; a pair of straight back stays and a pair of straight bottom stays both adapted for detachable and independent connection at one end with the rear wheel spindle, the members of each pair being connected together at their other ends by the transverse bolt and transverse spindle respectively; and additional stays adapted for detachable connection at one end with the rear wheel spindle and having their other ends brought together and left free and adapted for attachment to the engine.

6. A frame for cycles, motorcycles and the like comprising a steering head; top and intermediate rails each comprising a divergent pair of straight tubes bolted together and to the upper and lower parts respectively of the steering head at one end and secured together at their divergent ends by a transverse bolt common to both rails; a front down member and a diagonal member each comprising a divergent pair of straight tubes bolted at their divergent ends to the ends of a transverse spindle common to both members and at their other ends to the lower part of the steering head and to the transverse bolt respectively; a pair of straight back stays and a pair of straight bottom stays both adapted for detachable and independent connection at one end with the rear wheel spindle, the members of each pair being connected together at their other ends by the transverse bolt and transverse spindle respectively; additional stays adapted for detachable connection at one end with the rear wheel spindle and having their other ends left free for attachment to the engine; and a truss member running from one end of the transverse spindle to the opposite end of the transverse bolt.

7. A frame for cycles, motorcycles and the like comprising a steering head; top and intermediate rails each comprising a divergent pair of straight tubes bolted together and to the upper and lower parts respectively of the steering head at one end and secured together at their divergent ends by a transverse bolt common to both rails; a front down member and a diagonal member each comprising a divergent pair of straight tubes bolted at their divergent ends to the ends of a transverse spindle common to both members and at their other ends to the lower part of the steering head and to the transverse bolt respectively; a pair of straight back stays and a pair of straight bottom stays both adapted for detachable and independent connection at one end with the rear wheel spindle, the members of each pair being connected together at their other ends by the transverse bolt and transverse spindle respectively; additional stays adapted for detachable connection at one end with the rear wheel spindle and having their other ends brought together and left free and adapted for attachment to the engine; and a truss member running from one end of the transverse spindle to the opposite end of the transverse bolt.

8. A frame for cycles, motocycles and the like comprising a steering head, a tubular steering pillar rotatably mounted exteriorly of said head; top and intermediate rails each comprisising a divergent pair of straight tubes bolted together and to the upper and lower parts respectively of the steering head at one end and secured together at their divergent ends by a transverse bolt common to both rails; a front down member and a diagonal member each comprising a divergent pair of straight tubes bolted at their divergent ends to the ends of a transverse spindle common to both members and at their other ends to the lower part of the steering head and to the transverse bolt respectively; a pair of straight back stays and a pair of bottom stays both adapted for detachable and independent connection at one end with the rear wheel spindle, the members of each pair being connected together at their other ends by the transverse bolt and transverse spindle respectively; additional stays adapted for detachable connection at one end with the rear wheel spindle and having their other ends left free and adapted for attachment to the engine.

9. A frame for cycles, motorcycles and the like comprising a steering head, a tubular steering pillar rotatably mounted exteriorly of said head; top and intermediate rails each comprising a divergent pair of straight tubes bolted together and to the upper and lower parts respectively of the steering head at one end and secured together at their divergent ends by a transverse bolt common to both rails; a front down member and a diagonal member each comprising a divergent pair of straight tubes bolted at their divergent ends to the ends of a transverse spindle common to both members and at their other ends to the lower part of the steering head and to the transverse bolt respectively; a pair of straight back stays and a pair of straight bottom stays both adapted for detachable and independent connection at one end with the rear wheel spindle, the members of each pair being connected together at their other ends by the transverse bolt and transverse spindle respectively; additional stays adapted for detachable connection at one end with the rear wheel spindle and having their other ends brought together and left free for attachment to the engine; and a truss member running from one end of the transverse spindle to the opposite end of the transverse bolt.

GORDON INGLESBY FRANCIS.